United States Patent [19]

Gogulski

[11] 4,071,740

[45] Jan. 31, 1978

[54] MOBILE AUTOMATED SHOPPING SYSTEM

[76] Inventor: Paul Gogulski, 7 Maple Circle, Scarborough, Maine 04074

[21] Appl. No.: 689,968

[22] Filed: May 26, 1976

[51] Int. Cl.² .................... G06K 15/18; G06K 15/02; E04H 3/04
[52] U.S. Cl. ............................... 235/431; 186/1 AC; 235/432
[58] Field of Search .................. 235/61.11 E, 61.6 R, 235/61.7 B, 61.7 R, 61.9 R; 186/1 AC

[56] References Cited

U.S. PATENT DOCUMENTS

| | | | |
|---|---|---|---|
| 2,919,851 | 1/1960 | Otis | 235/61.9 R |
| 3,637,989 | 1/1972 | Howard et al. | 235/61.7 R |
| 3,716,697 | 2/1973 | Weir | 235/61.7 R |
| 3,836,755 | 9/1974 | Ehrat | 235/61.7 R |
| 3,947,816 | 3/1976 | Rabedeau | 235/61.11 E |
| 3,949,195 | 4/1976 | Wefers et al. | 235/61.11 E |

*Primary Examiner*—Daryl W. Cook
*Attorney, Agent, or Firm*—William Nitkin

[57] ABSTRACT

An improved automated shopping system used within stores of the type utilizing shopping carts having product code scanning means and product weight sensing means located thereon in conjunction with a central computer also located within the store wherein the improvement comprises a first scanner releasably mounted on the shopping cart, a control panel mounted upon the shopping cart, means for visual display of word and numerical entries on the control panel, means for the readings of the first scanner to appear on the visual display, means for totalling numerical data that appear on the visual display, a second scanner located on the control panel, means whereby the second scanner's numerical entries are totaled and the total, with the second scanner's other readings appear on the visual display, and a printout device located in said control panel which records and totals the numerical entries and prints them on tape.

4 Claims, 5 Drawing Figures

MOBILE AUTOMATED SHOPPING SYSTEM

BACKGROUND OF THE INVENTION

1. Field of the Invention

This invention relates to a computerized system for self-service shopping whereby customers, when purchasing items, need not check individual items through a check-out counter.

2. Description of the Prior Art

At present stores and markets selling merchandise and foodstuffs allow customers to pick items off shelves and deposit them into shopping carts. When the customer completes his selection of items, he checks his purchases through a check-out counter and receives a receipt which has recorded the price of each item. The customer then pays for the items which are bagged and the customer leaves with his purchases. This shopping method can be very time-consuming due to lengthy waiting periods in check-out counter lines.

Several advances in self-service shopping have been developed combining convenience to the shopper with cost savings to the retailer. One such development is an electronic scanner which reads line-encoded information printed on individual products and registers the identity of each product. The line code has been standardized industry-wide by the adoption of the Universal Product Code. This information is transmitted to a store's central computer which has the price of the identified item within its memory bank which then transmits this information back to the cash register or point-of-sale terminal where it is flashed on a screen and printed on a receipt. These computerized cash registers form a significant improvement in the art, but their utilization does not eliminate the need for individual product check-out at the check-out counter. Another significant advance in self-service shopping has been the invention of shopping carts designed to record the cost of items once they have been removed from the shelf. These shopping carts such as disclosed in U.S. Pat. No. 3,836,755 not only have scanning means to read line-encoded data on individual items, but also record the weight of an item as it is deposited in the cart and compare it with the known weight of that item. Further systems of automated shopping have been developed whereby a shopper can select a tag or computer-readable card which has either a picture and/or description of the item printed thereon, deposit the tags or cards in a central location within the store and the selected items will be automatically collected and forwarded to the customer with the total of his purchases already set out, all without the customer having to take them individually off the shelves and further, without the customer having to individually check each item out at a check-out counter. Such an automatic selection system is disclosed in U.S. Pat. No. 3,532,184 and related patents.

Although the above inventions have been available for use, the retail industry has made little progress in utilizing such systems in their retail operations. Many retailers feel that shoppers will be reluctant to change their basic patterns of shopping and that shoppers have a natural fear and distrust of computer technology.

The computerized shopping system of this invention is designed to eliminate the check-out procedure of individual items by utilizing some of the technology discussed above combined with particular novel refinements to instill confidence in the shopper that computers are not making errors in the totaling of this purchases.

SUMMARY

The system of this invention is an innovative utilization of present technology in combination to provide a viable system to eliminate the time-consuming check-out procedure and provide cost savings to the retailer. The system of this invention provides the shopper with a computerized printout concerning his purchases covering individual purchase prices and item identification with a running sub-total of the cost of items as they are deposited into the shopper's cart. The system, by shortening the time needed by a shopper to check-out and pay for his purchases, would require fewer check-out counters which in themselves do not contribute to store revenues and would thus increase the amount of usable sales space in the store. The system further provides security features to prevent customers from taking advantage of and/or attempting to cheat the system.

The component parts and the computer technology needed to build and operate the system of this invention are now known in the art. Each shopping cart and payment counter, however, must be specifically fabricated or adapted to accomplish the objects of this invention. In the system's basic embodiment each shopping cart contains a first hand-held scanner which is connected by a cable to a control panel which communicates via a transmitting and receiving device to an in-store computer. These scanners are simple to operate and can be easily used by customers without special training. A second stationary scanner is located on the control panel installed on the shopping cart. The control panel further includes a printer and a visual display unit and can also have an on-off control, a ready light which indicates that items can be entered into the cart, a special button provided for items that are on sale, and provision made for the entry of items that sell in multiples for a lower single price. The shopping cart can also have a reject button light which would be activated if there were an unauthorized entry made into the shopping cart and resetable by store personnel, and a travel button light to indicate that the cart is in movement and not able to accept entries. A ready light indicates that the cart has stopped and is in order to accept entries. Also each shopping cart has a weight-sensing device in the bottom of the product holding area. A light-sensing system located on the cart's top perimeter senses entries made into the shopping cart by the entry of the products breaking the light plane. An unauthorized entry will cause the shopping cart to cease operating.

The system is utilized in the following manner. As the shopper proceeds down the aisles of the store and selects an item off the shelf, he scans the line-encoded data imprinted on the item with the first hand-held scanner and the price of that item appears on the display unit along with the item's unit price and identification. If the shopper wishes to purchase the item and if he feels that the data appearing on the display unit is correct, he scans the item over the second stationary scanner which redisplays the same information and enters the price total on the customer's receipt. This dual scanning cross check is an important part of this invention and allows the customer to scan many items before making his purchase selection. After using the second scanner, the customer places the item into the shopping cart and the weight of that item is sensed by the weight-sensing device located on the bottom of the cart's product-holding area and the weight of the item is compared with the known weight of that item by the central computer. If the weight of the item is the same as the weight data stored within the central computer for that item, the item will be accepted. If the weight is incorrect, the reject light will go on and a correction must be made which will be discussed more fully below. The top light-sensing device normally activated by an entry made into the cart provides a brief period of time of the shopper sufficient to allow the item to be entered into the cart and for the customer to remove his hands from inside the cart. It is felt that the presence of this sensing device over the top of the cart will prevent fradulent entry of unscanned items and will cut down on shopper thefts. The weight-sensing devices placed in the shopping carts can be cushioned to protect them from the quantity of products that could be dumped on the devices and to prevent their accuracy from being affected by jostling.

When the customer has completed his shopping, he wheels the cart to the payment counter and pays for his purchases which have already been totaled. Within the shopping cart can be a removable bag into which the purchased items have been deposited. This disposable bag can be used by the shopper to carry his purchases out of the store and saves the time normally spent in bagging purchases. Following a purchase, another removable bag can be placed into the shopping cart and the cart is ready to be used by another shopper.

In one embodiment the system of this invention can utilize a two-way communication option whereby the shopper will have the ability to communicate with either the computer or with store personnel, and vice versa. For example, if a shopper has a question regarding the location of a particular item, he could communicate with store personnel via a microphone on his control panel and be advised of the item's location within the store.

It should be noted that each cart should transmit to the instore central computer on a channel that will not interfere with the transmissions from other carts to the central computer. A communication problem light could be installed on each shopping cart to indicate whether a communication problem is present having a message similar to "Please wait until a channel is clear." Also the carts could communicate with the in-store central computer utilizing a time-sharing system.

The power to run the electronics of each shopping cart could be in the form of a rechargable battery and when the cart is not in use, could be recharged.

The sensing device mounted on the perimeter of the top of the cart can consist of a series of photocell sensors and light sources creating a plane that when broken, deactivates the cart or signals the central office of the store that an unauthorized entry has been made and store personnel could check on the cart. The sensing device and the control panel can be adapted to be utilized on existing shopping carts. Existing shopping carts could also have means added for weight detection at the base of their product holding areas. In a further embodiment a second method of scanning can be utilized for the entry of an item whereby the product's line-encoded data is scanned by the second scanner located within the product entry area immediately before the product is deposited into the disposable bag. The hand-held scanner could still be available for a customer to check the price of a product on the shelf and compare it with the price that appeared on the display or tape after the product had been placed into the basket.

Conversion of retail stores to utilize the system of this invention could eliminate a majority of the current check-out area of a store and would eliminate the congestion of customers waiting to to have their purchases checked out. It is further felt that the reduction of check-out counters could increase by 10–15% the total floor area of a large retail store which space could be more productively used. Also the elimination of substantial number of counters could cut down on the number of employees hired as cashiers and baggers and provide significant savings to the retailer.

The central computer within the store can have a master control display unit located in the management office area to monitor aisles and give management information on the removal rate of products, traffic patterns within the store, etc. and with this information management could place the necessary orders or make any adjustments to handle the short supply of an item or ease traffic congestion. Further the information displayed on this master control display unit could show the day's unit sales and unit sales for each of the store's departments for inventory control purposes. An automatic restocking program can be utilized for the purposes. An automatic restocking program can be utilized for the restocking of shelves which would signal when an item is running low so that the shelf could be immediately restocked or an order placed for a resupply of that item.

Use of the system of this invention could eliminate the need for individual price labeling of products and the preparation of unit price information displays on the shelves as the shopper could readily obtain this information of the display unit of his control panel by using his hand-held scanner. Substantial savings would accrue to the retailer by the elimination of such labeling.

A further advantage to the shopper is that the print-out device would provide a running sub-total of the purchases made so that the shopper will not exceed what monies he has brought with him to the store. The shopper using the system of this invention will also benefit by significant time savings while doing his shopping. For the customer who is unable or unwilling to adjust to the system of this invention, a standard check-out counter and some standard shopping carts could be provided. it is felt that only a small number of customers out of the total would wish to use the standard check-out counter after being exposed to the benefits of the system of this invention.

DESCRIPTION OF THE PREFERRED EMBODIMENT

Figure 1:
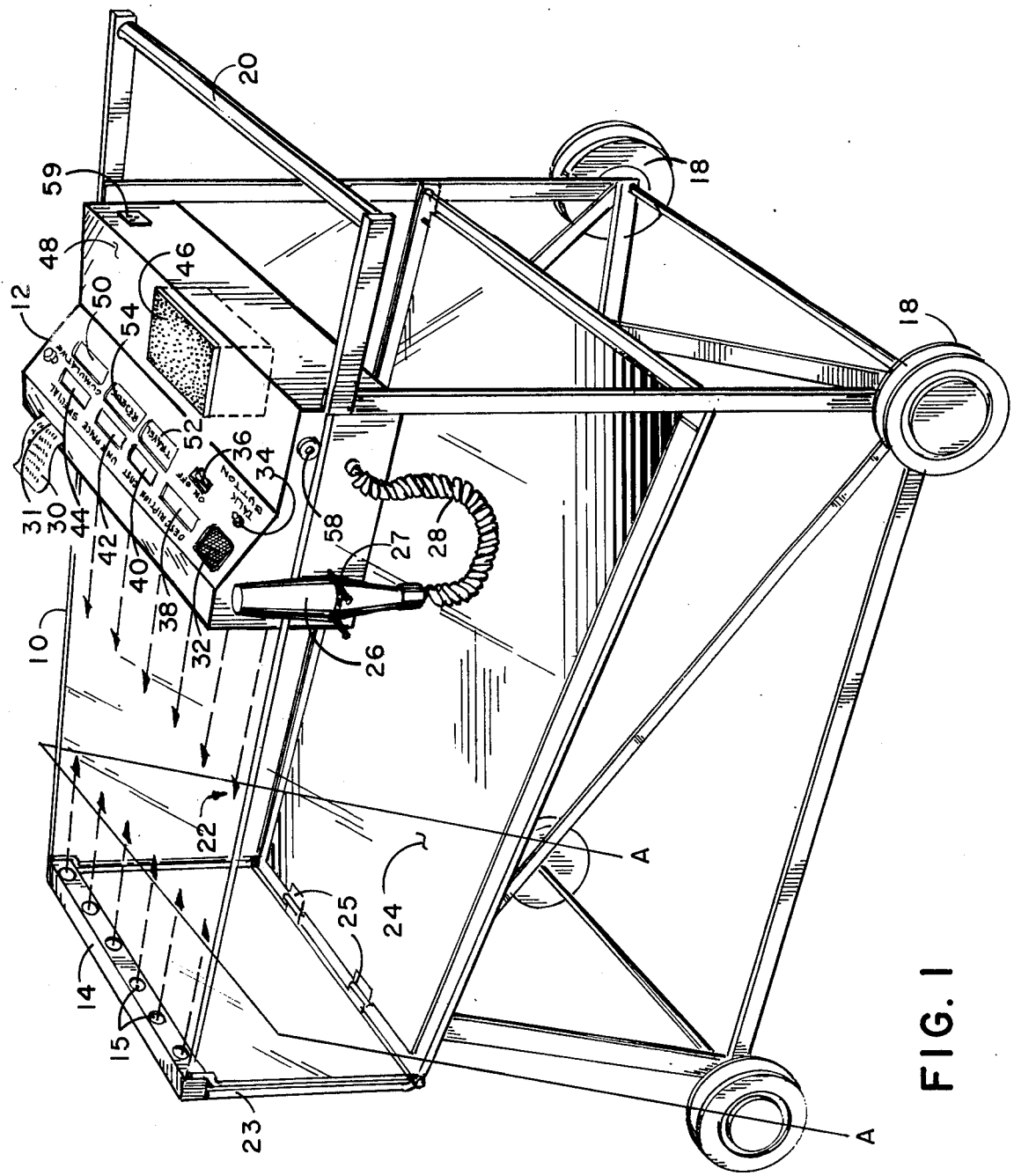
FIG. 1 is a perspective view of a shopping cart of the type utilized within the system of this invention.
Figure 2:
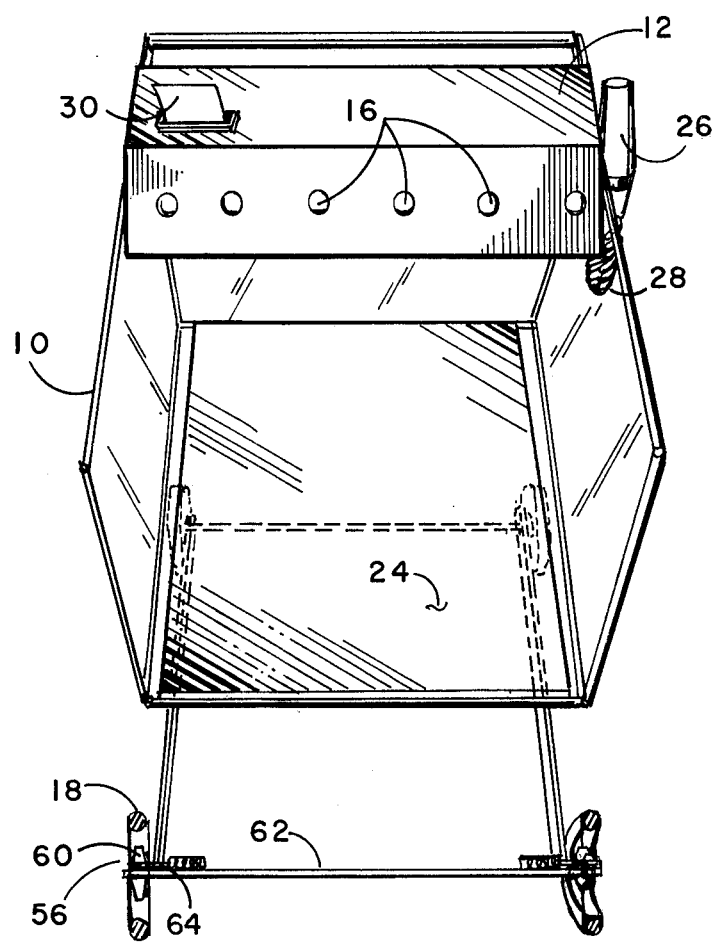
FIG. 2 is a cross-sectional view through points A — A of the shopping cart illustrated in FIG. 1.

FIG. 1 illustrates a perspective view of a shopping cart of the type utilized within the system of this invention. Control panel 12 is seen inserted into the upper rear section of shopping cart 10. The system of this invention can be constructed from carts specifically designed for its purposes or can be constructed in a manner to be adapted to shopping carts already in use within a store. In the upper front of the shopping cart is sensing panel 14 containing a plurality of closely spaced light-emitting elements 15 whose light is sensed by a plurality of photocells 16 illustrated in FIG. 2 which can sense any object breaking the plane between the perimeter of the top of the shopping cart. Shopping cart 10 includes standard items such as wheel members 18, handle 20, and merchandise holding area 22. At the base of merchandise holding area 22 is weight-sensing device 24 on which the purchased items rest. This weight-sensing device can be similar to the weight-sensing device disclosed in U.S. Pat. No. 3,836,755, an electromechanical scale, or equivalent. Also seen in this view is handheld scanner 26 releasably mounted on bracket 27 at the end of control panel 12 and attached to control panel 12 by line 28 which can be retractably coiled so that the line will not become tangled during use. Hand-held scanner 26 is utilized to read the line-encoded information imprinted on the product to be purchased or on the tag affixed to that product. Such sensing devices are well-known and can be similar to a device such as disclosed in U.S. Pat. No. 3,920,959, Welsh Allen #81000, or equivalent which read line-encoded information such as the Universal Product Code or equivalent systems of line-encoded information. Paper tape 30 is shown emanating from paper tape printer exit slot 31. On tape 30 is recorded each item purchased and can also include sub-totals. Tape 30 can be comprised of a multipart tape such as NCR Paper Tape or equivalent to produce a plurality of imprintings at one time. Also seen on the operation face of control panel 12 is microphone speaker unit 32 associated with talk button 34 which is depressed when a customer wishes to verbally communicate with a store's central office. The control panel contains within it a transmitting and receiving radio unit which may be similar to a Radio Shack TRC101B or equivalent which is utilized for such communications. Also on the operation face of the control panel is on-off switch 36 to activate or deactivate control panel 12. Several visual display units are also located on the operation face of control panel 12. These include product description visual display 38 which displays the identification and net weight of the product identified by scanner 26 which information is derived from the line-encoded information imprinted on the product. Control panel 12 communicates this information by a transceiving device to a central computer in the store which has on record in its memory bank the cost of that product so identified. The central computer then transmits this information to the control panel and the price of that item appears in visual cost display 40. Also transmitted with the cost is information concerning unit price information which appears in visual unit price display 42. If an item is on sale, that information would also be transmitted to the control panel and would appear within "special" visual display 44. It should be noted that equivalent display units, such as all information appearing on one television-type screen can also be utilized to accomplish the same functions as individual displays. Second scanning unit 46 which operates similarly to hand-held scanner 26 is located on shelf surface 48 of control panel 12. This second scanning out can be similar to a Singer Dual Maxi Scanner or of the type utilizing a low power helium neon laser producing a beam of monochromatic light that is shaped by lenses directed by moving mirrors sweeping the light through a pattern of overlapping sine waves which is projected out through a window in the scanner and reflects off the line-encoded information on the package being scanned. This reflected light is detected by a photomultiplier tube which generates pulses corresponding to the dark and light lines of the line coded symbol. These pulses are decoded and analyzed by the computer to identify the product being scanned. There are several of these systems now in use and any of them can be adapted to work with this invention. If the customer determines that an item is to be purchased, he passes the coded portion of the item over scanner 46. This procedure then enters the price of the item onto tape 30 and also prints the cumulative amount of the purchase including the item just scanned within cumulative visual display 50. At this point, photocell sensing units 16 are deactivated for a brief period of time and the item can be entered into merchandise holding area 22 of shopping cart 10 and will rest upon weight-sensing device 24. Weight-sensing device 24 which is associated with control panel 12 computes the additional weight of the item now within the shopping cart and a comparator circuit within the control unit compares the weight of the item entered with the known weight of the item already stored within the memory of the central computer. If the two coincide, the unit remains activated and the customer continues shopping. If the weights do not coincide or if the sensing plane is broken without first being deactivated by scanning an item with second scanner 46, then reject light 54 on control panel 12 lights up. In one embodiment, when the reject light is lit, a braking mechanism 56 as seen in FIG. 2 within shopping cart wheels 18 is activated thereby stopping shopping cart 10. This stoppage quickly brings to the attention of the customer that an error has been made. At this point the customer can summons assistance by utilizing talk button 34 to communicate through microphone speaker 32 with the central office of the store. A store employee can deactivate photocells 16 by the insertion and turning of a special key only held by store personnel into switch 58. This action will allow the store employee to remove the last inserted item from the merchandise holding area of the cart and will also allow him to pass that item over scanner 46 to enter a credit of the cost of that item onto tape 30 and to reduce the cumulative visual display 50 also by the cost of that item if the price had previously been entered.

Control panel 12 is powered by a rechargeable battery located inside the control panel which can be recharged at night by the insertion of a recharging plug into plug receptacle unit 59 through which electrical current enters the unit. Equivalent charging means can also be utilized. In another embodiment front panel 23 of cart 10 may lower, pivoting on hinges 25, to allow for easier removal of the cart's contents.

FIG. 2 is a cross-sectional view through shopping cart 10 at points A — A as viewed towards the rear of the cart. Seen in this view are weight-sensing device 24, a cutaway view of front wheels 18 showing electrically-activated braking mechanism 56 which can consist of ratchet gear 60 through which axle 62 of wheel 18 runs and to which it is affixed, and pawl member 64 which can, by electromagnetic force, be engaged to prevent further movement of ratchet gear 60 and its associated wheel member 18, the electromagnet only being activated upon current input when reject light 54 is activated. Equivalent braking means can also be utilized in conjunction with the activation of reject light 54. Also seen in FIG. 2 are photocells 16 which can be Electronic Corporation of America Model 47 CN4 or equivalent located on the rear of control panel 12 which receive light from light-emitting elements 15 which can be Electronic Corporation of America Model 47C A4 or equivalent opposite them on the upper front of shopping cart 10.

It should be noted that if the reject light is activated, the shopping cart does not necessarily need to shut down and stop as it is sufficient for the printout device to cease operating and for the cart to be then used as a standard manual cart wherein each item to be purchased would be checked out individually through a standard checkout counter.

Figure 3:
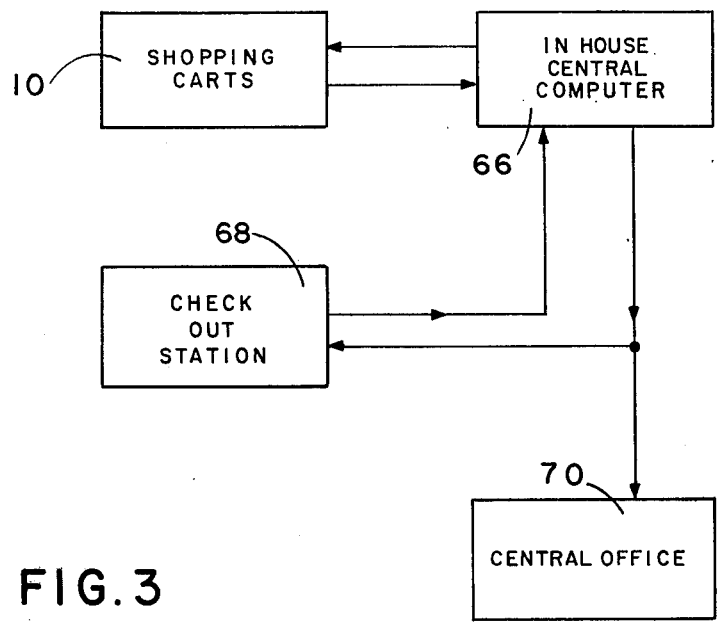
FIG. 3 is a schematic diagram in block format showing the various elements of the system of this invention.

FIG. 3 is a schematic diagram in block format showing the various elements of the system of this invention. In-house central computer 66 which can be similar to an NCR 255 system or equivalent with time-sharing or multichannel transmitting and receiving units such as a type similar to a Radio Shack TRC101B or equivalent to communicate with individual shopping carts 10. The in-house computer also communicates by cable or equivalent means with each check-out station 68 and with the display terminal and monitoring station 70 within the central office.

Figure 4:
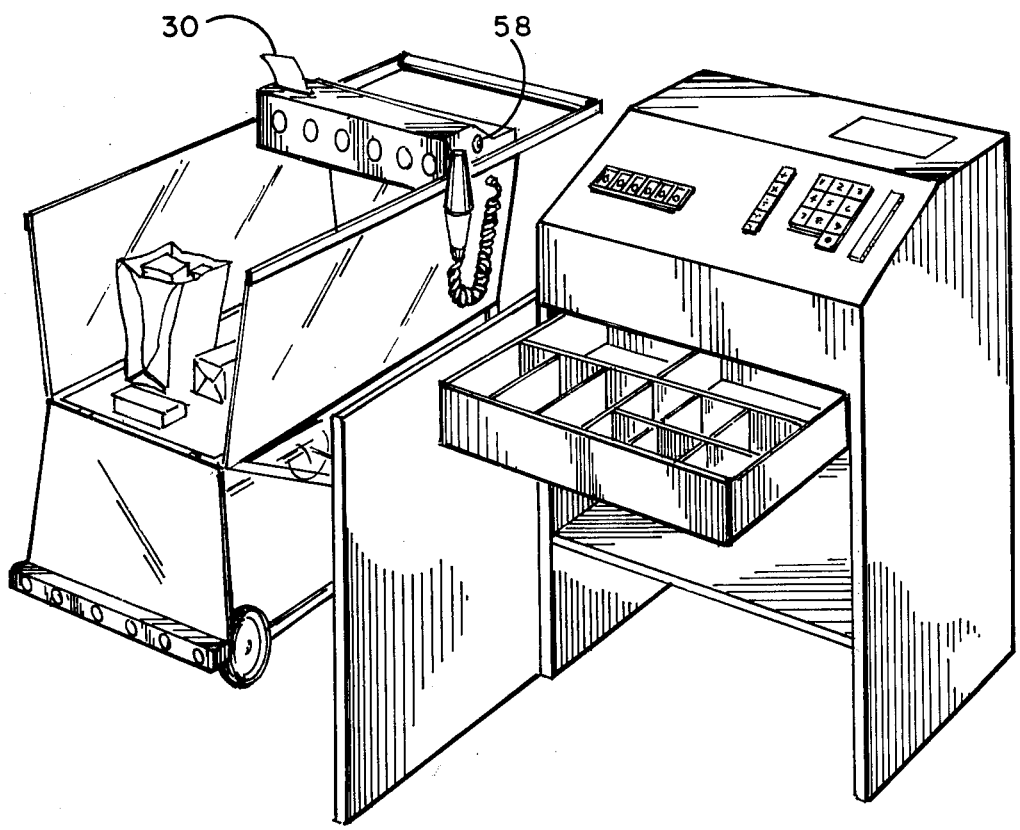
FIG. 4 illustrates a typical check-out station utilized with the system of this invention.

FIG. 4 is a view of a typical check-out station for the system of this invention where a copy of tape 30 is retained by the store and a copy given to the customer as a receipt, the total on the tape is entered and payment is made by cash or by charge card by the customer and cart switch 58 is deactivated so that the customer can remove his merchandise from the shopping cart. As a further cross check, the in-store central computer can transmit to the check-out station its total of the carts purchases which should coincide with the cart's total. The merchandise can be bagged at this point or, in an alternative embodiment, the bags can already be within the cart as the merchandise is placed therein so that it is already bagged and ready to leave the store after payment is made by the customer.

Figure 5:
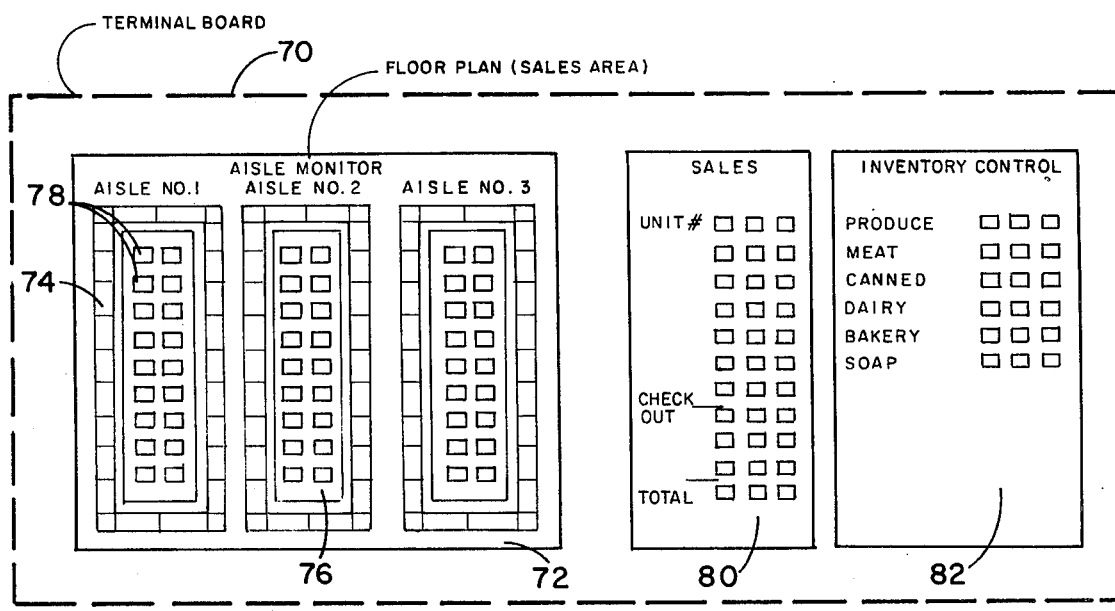
FIG. 5 is a schematic diagram in block format of the display terminal and monitoring station located at the central Office of the store utilizing the system of this invention.

FIG. 5 is a schematic diagram in block format of the display terminal and monitoring station located at the central office of the store utilizing the system of this invention. Located on display terminal and monitoring station 70 within the central office is also monitor 72 which visually displays the location of all shopping carts within the store located by means of their individual transmissions, each cart identified by its own transmitted code or by a distinct frequency upon which it broadcasts or by equivalent identification means. A series of receivers within the store can triangulate and determine the location within the store of each cart and cause that location to activate a light within light panel 74 that is the equivalent position of the cart within the store. Other methods of location of carts can be used such as ceiling or floor grid detectors. Also when an item is removed from a shelf and checked into the customer's cart, the cart's location can be identified at that instance by the known location of the item selected. These light panels can be displayed in association with aisle displays 76 each with products located along that aisle identified by labeling means 78. Also within display terminal and monitoring station 70 can be sales monitor 80 which displays the total amounts of sales by each check-out station each shopping cart unit, and the total of all sales made during the day. Also included within display terminal and monitoring station 70 is inventory control panel 82 which displays inventory data based on item identification of each sale which can be broken down by departments within the store. This inventory control panel can also be associated with transmissions to a remote distribution center to direct shipments of items necessary to restock the shelves.

Although the present invention has been described with reference to particular embodiments, it will be apparent to those skilled in the art that variations and modifications can be substituted therefor without departing from the principles and spirit of the system of this invention.

I claim:

1. An improved automated shopping system means for the purchasing of line-encoded identified products and articles utilized in stores of the type having shopping carts having associated therewith apparatuses providing product code indicia scanning means and weight sensing means utilized in conjunction and communication with a governing central computer, having stored product information related to said line-encoded indicia, by means of radio transmitting and receiving units wherein the improvement comprises:

a control panel and associated visual display unit affixed to said shopping cart for operation of a cart of said shopping system and for indication by display of said line-encoded product representative indicia;

a first line-encoded indicia scanner releasably mounted upon and connected with said control panel to read said line-encoded indicia upon said products having means responsive to said first scanner to decode and to display upon said visual display said product information derived by said first scanner from said products by means of transmission and reception of said product information with said central computer;

a second line-encoded scanner mounted within said control panel having means to decode and to cause display upon said visual display of said product line-encoded information derived from said products by means of transmission and reception of said information with said central computer;

a plurality of photocell sensing units positioned about the perimeter of the opening of said shopping cart to direct a plane of light across said cart opening to sense certain entries into said cart, said sensing units being responsive to said second scanner and decoding means such that said photocell sensing units deactivate for a predetermined period of time after said second scanner reads and decodes said line-encoded information to allow the insertion of a product or article in said cart and after said time period reactivates to provide a warning if an article is attempted to be inserted within said cart without first being scanned by said second scanner; and said weight-sensing means being within the bottom of said cart and having an associated comparator circuit in said control panel in communication with said central computer to provide a means of comparison of actual and computer stored product weights and to provide a warning if said weights do not correspond.

2. The shopping system apparatus as recited in claim 1 wherein said photocell sensing units and warning system include:
   a braking system for the wheels of said cart being responsive to said plane of photosensor light being broken and being activated by means of said circuitry associated with a warning light activated when said light plane is broken.

3. The shopping system apparatus as recited in claim 2 wherein said weight sensing means has circuitry associated with said braking system such that when said actual and stored weight comparisons do not correspond, said braking system is activated in conjunction with a warning light.

4. The shopping system apparatus as recited in claim 1 including a printer and tape responsive to line-encoded information decoded by said second scanner and said central computer for printing a cumulative tabulation of products passed over said second scanner as stored by said central computer.

* * * * *